United States Patent [19]

Gurd et al.

[11] Patent Number: 4,860,250
[45] Date of Patent: Aug. 22, 1989

[54] DATA PACKET SHORTENING METHOD AND DEVICE

[76] Inventors: John R. Gurd, 8 Circular Road, Withington, Manchester, M20 9LP, United Kingdom; Katsura Kawakami, 16-3 Mominokidai Midoriku, Yokohamasi Kanagawaken, Japan

[21] Appl. No.: 56,133

[22] Filed: May 28, 1987

[30] Foreign Application Priority Data

May 29, 1986 [GB] United Kingdom ............... 8613071

[51] Int. Cl.$^4$ .............................. G06F 3/00; H04J 3/24
[52] U.S. Cl. .................................. 364/900; 364/955.5; 370/94
[58] Field of Search ... 364/200 MS File, 900 MS File; 370/58, 60, 85, 94; 340/825.5

[56] References Cited

U.S. PATENT DOCUMENTS

| | | | |
|---|---|---|---|
| 4,218,756 | 8/1980 | Fraser | 364/900 |
| 4,413,337 | 11/1983 | Dauphin et al. | 370/58 |
| 4,542,498 | 9/1985 | Bodros et al. | 370/60 |
| 4,590,467 | 5/1986 | Lare | 370/85 X |
| 4,593,281 | 6/1986 | Lare | 340/825.5 |
| 4,631,534 | 12/1986 | Franklin et al. | 370/85 X |
| 4,700,184 | 10/1987 | Noirel et al. | 340/825.5 |

*Primary Examiner*—Thomas M. Heckler
*Attorney, Agent, or Firm*—Spensley Horn Jubas & Lubitz

[57] ABSTRACT

A data packet shortening method for shortening data packets passed between first and second devices. The data packets include address data which is sent from the first device to the second device and returned to the first device unchanged. The address data is temporarily stored at an address of a memory device, and the address data and the address of that data in the memory device is sent from the first device to the second device. When it is necessary to communicate the address data from the second device to the first device a data packet is sent which includes the address of that data in the memory device but does not include the actual address data. The required address data is derived by the first device from the address of that data in the memory device.

4 Claims, 27 Drawing Sheets

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

DATA PACKET SHORTENING METHOD AND DEVICE

BACKGROUND OF THE INVENTION

1. Field of the Invention

The present invention relates to a data packet shortening method and device, which makes it possible to reduce the length of a data packet in an electronic computer.

2. Description of Related Art

In microcomputers, when a process is being carried out which uses data stored in a memory device, the process of reading particular data is carried out by sending a read request related to a particular address of the memory device. In serial processing computers it is not generally possible to read data which has not yet reached the memory device. Where serial processing computer systems operate such that commands of a program are executed separately in separte devices there are circumstances in which an attempt is made to read information which has not yet arrived in the memory device. In such systems, it is necessary to have a construction whereby the read request is delayed and processed after the missing data has arrived in the memory device.

FIG. 1a is a diagram illustrating the relationship between a delay management device, a processing device, and a memory device. The memory device is capable of delaying read requests. The memory device 100 comprises four parts, that is a distribution (allocation) section 100a, a memory section 100b, a delay (defer) processing section 100c and a clear section 100d. Channels 101 and 102 enable data to be sent from the processing device 103 to the memory device 100, and from the memory device 100 to the processing device 103 respectively.

The exchange of data between the processing device 103 and the memory device 100 is entirely by the sending of individual data packets (hereinafter referred to as "tokens"). When the distribution section 100a of the memory device 100 receives a memory space request token 104, it sends a start address for the requested space depending on the requested size in the form of a token 107. The memory section 100b receives a write token 105 and a read request token 106. In accordance with the former it enters a parameter V into address A, and in accordance with the latter, it reads the contents V of the address A and sends this to the processing device 103 as a data token 108. For tokens other than the write token a response is required, and responses are identified by parameter Ra. The delay processing section 100c and the clear control section 100d do not deal directly with the communication of tokens to and from the processing device 103. The delay processing section 100c carries out the processing of read requests relating to data which has not yet arrived in the memory section 100b, and the clear control section 100d carries out the process of making memory space available when it is no longer being used.

The different types of tokens are distinguished by a code. FIG. 1b illustrates an example of the construction of each of the tokens. Numerals 464 to 468 correspond to 104 to 108 respectively in FIG. 1a. Each token has four fields, namely a code field 451, a second field 452, a third field 453, and a fourth field 454.

The code field 451 is used to distinguish between the different kinds of token, and in the examples of FIG. 1b the code field has four bits, which can identify up to sixteen different kinds of tokens. The second, third and fourth fields, 452 to 454, all comprise twenty four bits in the illustrated examples for the sake of simplicity, but these numbers may be adapted to the needs of the particular system. The shaded areas in the diagrams represent fields which are not being used.

FIGS. 2a, 2b and 2c are diagrams which serve to explain in more detail the function of the memory section 100b and the delay processing section 100c shown in FIG. 1a. In FIG. 2, channels 201 and 202 serve to convey tokens to and from the memory section 100b respectively. Each address within the memory section 100b consists of a flag field and a data field, the flag field comprising a valid flag 203 which shows whether or not there is any significant data stored within the data field, and a delay flag 204 which shows whether or not a read request relating to that address has already been delayed. That is to say, when data is entered in the data field 205 by a write token, the valid flag 203 becomes "1", and when that address is returned to its original state the valid flag becomes "0". When a read request token has been delayed, the delay flag 204 becomes "1" and when data has been entered into the address, or the word has reverted to its original state, the delay flag becomes "0".

Referring to FIG. 2a, when a read request token 206 which corresponds to an address A reaches a memory section 100b, the response of the memory 100b depends on the state of the valid flag within the address A. That is to say:

1. If the valid flag is "1", then as shown in FIG. 2b, the value V stored in the data section of the address A is read, the value V is joined to the identifier parameter Ra of the read request token, and the result sent out as a data token 207.

2. If the valid flag is "0", then as shown in FIG. 2c, the read request token is housed in a token housing field 207 of an arbitrary free address (for example address Q) within the delay processing section 100c. However, for the sake of memory space economy, the address parameter A is deleted, but this deletion is not necessary. Data is entered in a linking field 208 of address Q. This data is represented by an asterisk in the drawings, and shows that in this case it is a first delay token relating to the address A. A token store address pointer Q is stored within the data field of address A to which the delayed read request relates. The delay flag 204 has "1" entered in it.

In this device more than one read request token can arrive relating to a single address of the memory section 100b. Accordingly several tokens can be delayed which relate to one address. Referring to FIGS. 3a and 3b, in such circumstances the delay tokens are stored as a series. In FIG. 3a, numerals 301 to 305 identify elements which correspond to components 201 to 205 of FIG. 2a. The series fields for the addresses in the delay processing section 100c are used to arrange the delay tokens in a series. When a write token 307 arrives in address A then, referring to FIG. 3b, the delay tokens which are associated with address A are all released. The value V is entered into the data field of the address A of the memory section 100b, and at the same time "1" is entered into the valid flag 303 and "0" is entered into the delay flag 304. The address Q3 previously stored in the data field of address A is reviewed, and then address Q2 (stored at address Q3), and then address Q1(stored at address Q2). The series of three delayed token can thus be regenerated. The value V which is now stored at address A is joined with the stored identifiers Ra3, Ra2 and Ra1 to form data tokens 308 to 310 which are sent to the processing device. The address Q1 to Q3 which stored the delay tokens become free addresses and can be used for subsequent delay tokens.

In the above-described process, during the time that the delay token series process is being conducted, it is not possible to read or write data, and this means that the system is slow. The problem cannot simply be solved by separating the memory section 100b and the delay processing section 100c as shown in FIG. 4a and making use of the device explained with reference to FIGS. 2a to 2c. That is to say, in systems like that shown in FIGS. 4a and 4b, operation of the memory section 100b and the delay processing section 100c at the same time gives rise to new problems. These problems are explained below with reference to FIGS. 4a to 4e.

In FIG. 4a, numerals 401 to 405 correspond to 301 to 305 respectively of FIG. 3a, and identify elements which function in the same way. Channels 409 and 410 convey tokens from the delay processing section 100c to the memory section 100b and from the memory section 100b to the delay processing section 100c respectively. In FIG. 4a, two read request tokens relating to address A are shown as having been delayed, and furthermore a new read request token 411 has arrived at the address A. The results of this situation are described below.

1. The read request token 411 is delayed so that the valid flag 403 of the address A is "0", and as in FIG. 4b, it becomes delay token 412 which is sent to the delay processing section 100c. The delay token 412 includes the start address Q2 of the delay series. The address Q2 is stored in the address A.

2. When the delay token 412 arrives at the delay processing section 100c, as shown in FIG. 4c the token 412 is stored in an arbitrary free word (for example Q3) and at the same time a new start address token 413 is sent to the memory section 100b. The token 413 includes the new start address Q3 of the delay token series which must be communicated to the memory section 100b.

FIG. 4f shows the make-up of the tokens DREAD and NQA. In FIG. 4f, fields 751 and 754 correspond to the fields 451 to 454 in FIG. 1b. The shaded parts of the diagram are fields which are not used.

Assuming that a new read request token relating to address A arrives at the same time at the memory section 100b, the following possibilities arise:

3. If the token 413 arrives before the token 414, then the memory 100b enters the parameter Q3 included in token 413 into the address A. Then as shown in FIG. 4d, the pointer stored in address A indicates the start of the delay series, and token delay processing can continue normally.

3'. If the token 413 arrives after the token 414, the token 414 is delayed and as shown in FIG. 4e it becomes a token 411. The parameters of the delay token 411 include the value Q2, and although the token 411 is housed within the delay processing section 100c there are two tokens which are associated with the address Q2, and the normal series cannot be followed.

To deal with the above problem, the device illustrated in FIG. 5 has been devised. Referring to FIG. 5, which is a block diagram, a processing device 1 is shown which corresponds to the processing device 103 of FIG. 1a. A memory section 2 and a delay processing section 3 correspond to the memory section 100b and delay processing section 100c of FIG. 1a. Communication devices 4 and 5 convey tokens between the processing device 1, the memory section 2, and the delay processing section 3, and these devices 4 and 5 correspond to the channels 101 and 102 in FIG. 1a.

The memory section 2 comprises a buffer 2a which temporarily holds tokens which are received from the communications device 4. A control section 2b identifies the different kinds of tokens that are received and, depending on their type, the parameters of the tokens are stored in a memory 2c or the contents of the memory 2c are read. A buffer 2d serves the purpose of sending tokens to the communications device 5 from the control section 2d.

In the delay processing section 3, a buffer 3a temporarily holds tokens which are received from the communications device 4. A control section 3b distinguishes between the different kinds of received tokens and depending on the type of these tokens it either stores their parameters in a memory 3c or reads the contents of the memory 3c. A buffer 3d serves to send tokens from the control section 3b to the communications device 5.

Referring to FIG. 6, this serves to illustrate an important feature of the control section 2b and the memory section 2c of the memory 2. The memory section 2c stores the addresses Q3, Q4, Q5... QN etc. of free space in the memory section 3c shown in FIG. 1. The free address space in the memory 3c which is available for use is indicated by a stack pointer 20. A buffer 21 supplies fresh addresses which have become available. Thus free addresses accumulate and are used as required.

A method of delay processing in which a normal series of single addresses for delay tokens is built up will now be explained. The arrangements shown in FIGS. 5 and 6 are simply examples of the possible constructions, which need not be limited to for example the buffers 2a, 2d and the control section 2b. The operation of the described arrangement is however described with reference to FIGS. 7a to 7g.

Referring to FIG. 7a, a free memory space 30 in the memory 2c of the memory section 2 includes space 30a in which are stored the addresses of free space in the memory 3c shown in FIG. 6. A valid flag 30b and a delay flag 320c correspond to flags 403 and 404 as shown in FIG. 4a. Numeral 31 indicates free memory space within the memory 3c of the delay process section 3. Channels 32, 33, 34 and 35 are provided to convey tokens and correspond to the communication devices 4 and 5 shown in FIG. 5.

Referring to FIG. 7a the operation of the delay processing device shown in FIGS. 5 and 6 will now be explained. FIG. 7a illustrates the situation, as also shown in FIG. 4a, in which delay of two read request tokens has already occurred, and a new read request token 512 is arriving at the memory section 2. In contrast to FIG. 4a however, the address space 30a is provided for storing free address in the delay processing section 3. A free address token 511 includes a free address in the delay processing section 3 as a parameter, and delivers that address to the address space 30a. This is described below:

1. When the memory section 2 receives the free address token 511 and the read request token 512, the valid flag 30b is "0", and thus as illustrated in FIG. 7b, the read request is turned into a delay token 513 and sent to the delay processing section. The address parameters are removed from the read request token 512, and by adding the value Q2, which is held in the address A, and Q3, which is the parameter held by the free address token, the delay token 513 is made up. Then the free address Q3 is stored in the address A.

2. When the delay token 513 arrives at the delay processing section 3, as shown in FIG. 7c, the other parameters of the delay token are stored in the address Q3. The parameter Q2 is housed in a series field. In the address A of the memory section 2, the address Q3 has already been entered, so the delay series is complete.

3. The delay processing section 3 then makes a new free word token 514 and sends this to the address section 30a of the memory section 2 for use in a subsequent token delay process.

With the above-mentioned procedure, the problems outlined with reference to FIGS. 4a to 4f do not occur. That is to say, even in the situation such as that shown in FIG. 1b where a delay token 513 has not yet arrived at the delay processing section 3, the memory section 2 can still effectively delay a token related to the address A. For example, in the situation shown in FIG. 7b, when a token related to address A is delayed, the delayed token should have the parameters Q4, Q3 and Ra4 (token 520 in FIG. 7d). Q4 is a free address in the delay processing section 3 previously entered in the address space 30a of the memory section 2. When this token arrives in the delay processing section 3, it is quite clear that it forms a series. For example, even if the token 520 overtakes the token 513 of FIG. 7d, the order of the series is not changed and a normal series is completed once the token 513 has arrived.

On the other hand in the situation shown in FIG. 7c, when a write token relating to address A arrives, delay tokens which are related to the address A are released as described hereinbelow.

4. When the memory section 2 receives the write token, it reviews the delay flag 504, and because the value of this is "1" it knows that there is at least one delay token associated with the address A. Thus, at the same time as the value V is entered into address A, the release request token 516 is generated. Then the valid flag 30b is changed to "1", and the delay flag 30c is changed to "0".

5. The release request token 516 includes the address A and the value Q3 which as shown in FIG. 7e, and delivers this data to the delay processing section 3.

6. When the delay processing section 3 receives the release request token 516 it knows from its parameter Q3 the start address of the series to be released. The delay processing section 3 joins the address parameter A to the delay tokens which belong to this series, and generates read request tokens identical to the original read request tokens before they were delayed, that is token 517 to 519 in FIG. 7f. These read tokens are sent to the memory section 2. Then each of the address at which the delay tokens were stored in the delay processing section 3 becomes a free address.

7. When the read request tokens arrive at the memory section 2, they read the address A and join the value V to the identifier (Ra3, Ra2, Ra1) address and send corresponding data tokens to the processing device 1.

The tokens READ and WRT in FIGS. 7a to 7f have exactly the same form as the READ and WRT tokens illustrated in FIG. 1b.

The form of the tokens DREAD, FA and RRQ which occur in FIG. 7a to 7f, are shown in FIG. 7g (the shaded sections in the diagrams represent fields which are not used). In the same diagram, 551 to 554 correspond to 451 to 454 in FIG. 1b.

The token DREAD in FIG. 7g is different from that of FIG. 4f, in that it uses one more field. FA corresponds to NQA in FIG. 4f, but it uses one less field.

Since the read request tokens 517 to 519 released from the delay processing section 3 have exactly the same form as the delayed read requests to which they relate, there is no need to distinguish in the memory section 2 whence these tokens came. For the sake of simplicity of explanation, referring to FIG. 7a, free token 511 is sent to the address space 30a of the memory section 2 at the same time as the read request token 512. Even if several free address tokens have accumulated in the address space 30a this is all right. Each time the delay processing section 3 receives a delay token, if it sends a free word token to the memory section 2, the accumulation of free word tokens in the memory section 2 is maintained.

In the process described with reference to FIG. 7a to 7g, the delay token 513 has three parameters. That is to say, the address Q3 into which is to be entered the token 513, the start address Q2 of the already existing token series, and the identifier address Ra3. This means that the data packet of the token which holds all three parameters is long, and the token channel requires expensive hardware. The address required to identify empty space in the memory device 31 for use with the delay tokens tends to be large, and the bit packages for entering addresses Q3 and Q2 are equally large.

It is an object of the present invention to obviate or mitigate the above problems by shortening the length of the tokens.

SUMMARY OF THE INVENTION

According to the present invention, there is provided a data packet shortening method for shortening data packets passed between first and second devices which data packets include address data which is sent from the first device to the second device and returned to the first device unchanged, wherein the said address data is temporarily stored at an address of a memory device, the said address data and the address of that data in the memory device is sent as a data packet from the first device to the second device, when it is necessary to communicate the said address data from the second device to the first device a data packet is sent which includes the said address of that data but does not include the said data, and the said data is derived by the first device from the said address of that data in the memory device.

The invention also provides a data packet shortening device comprising first and second devices between which data packets are passed which include address data that is sent from the first device to the second device and returned to the first device unchanged, a memory device, means for temporarily storing the said address data at an address of the memory device, means for sending the said address data and the address of that data in the memory device as a data packet from the first device to the second device, means for detecting when it is necessary to communicate the said address data from the second device to the first device, means for sending a data packet which includes the said address of that data but does not include the said data from the second device to the first device, the first device comprising means for deriving the said data from the said address of that data in the memory device.

BRIEF DESCRIPTION OF THE DRAWINGS

The present invention will now be described, by way of example, with reference to the accompanying drawings, in which:

FIG. 1b is a schematic diagram of a token used in the device of FIG. 1a;

FIGS. 2a to 2c, FIGS. 3a and 3b and FIGS. 4a to 4f are schematic diagrams which explain the delay processing method for the prior art of FIG. 1a;

DESCRIPTION OF THE PREFERRED EMBODIMENT

Figure 1A:
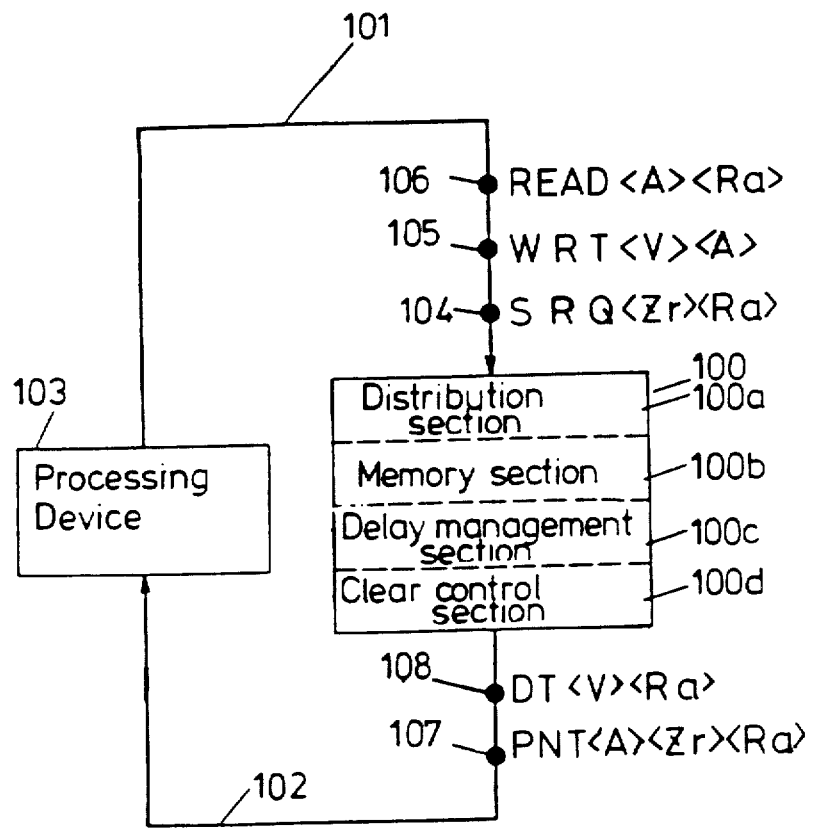
FIG. 1a is a block line diagram of a further delay processing device of the prior art.
Figure 1B:
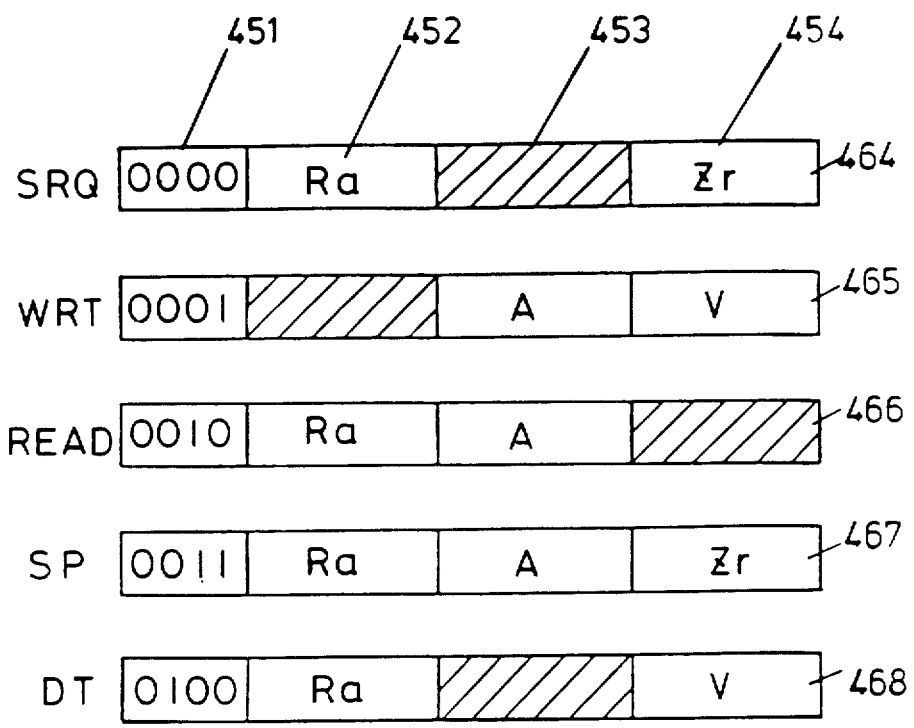
Figure 2A:
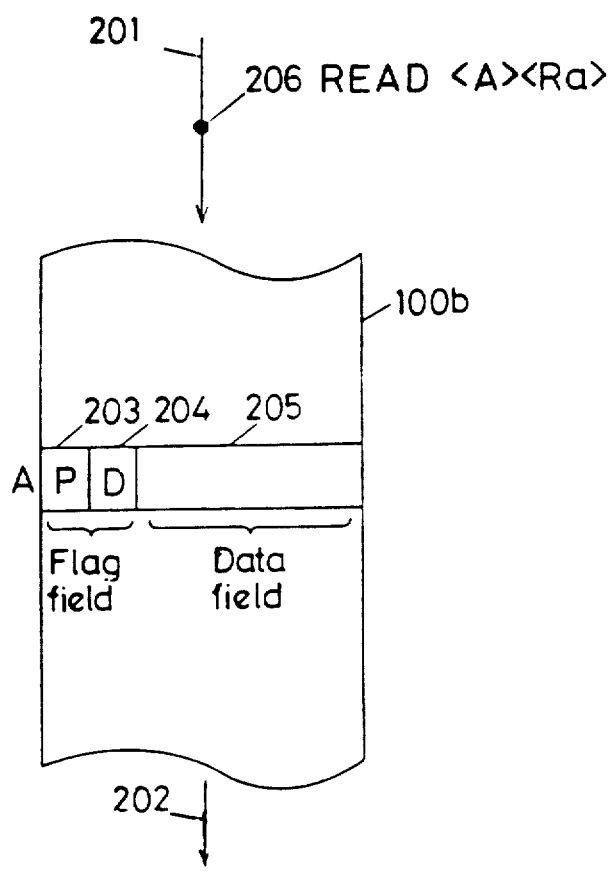
Figure 2B:
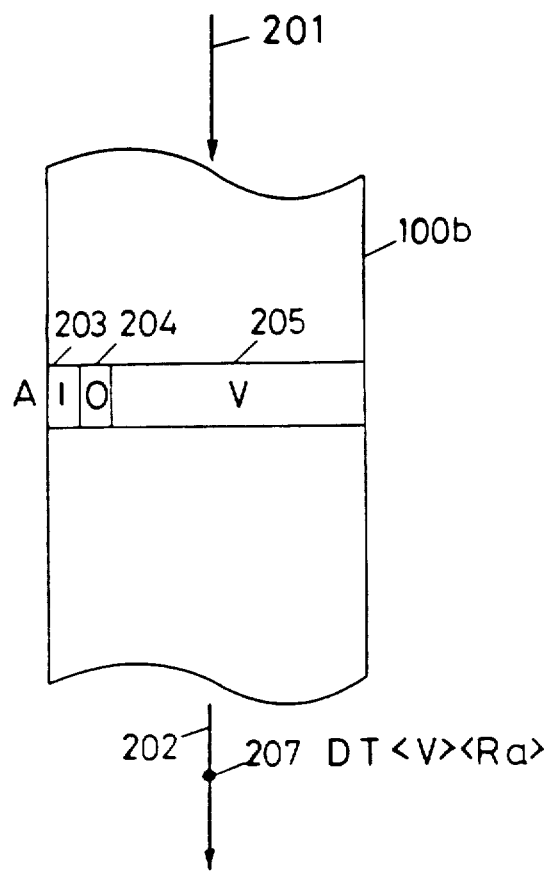
Figure 2C:
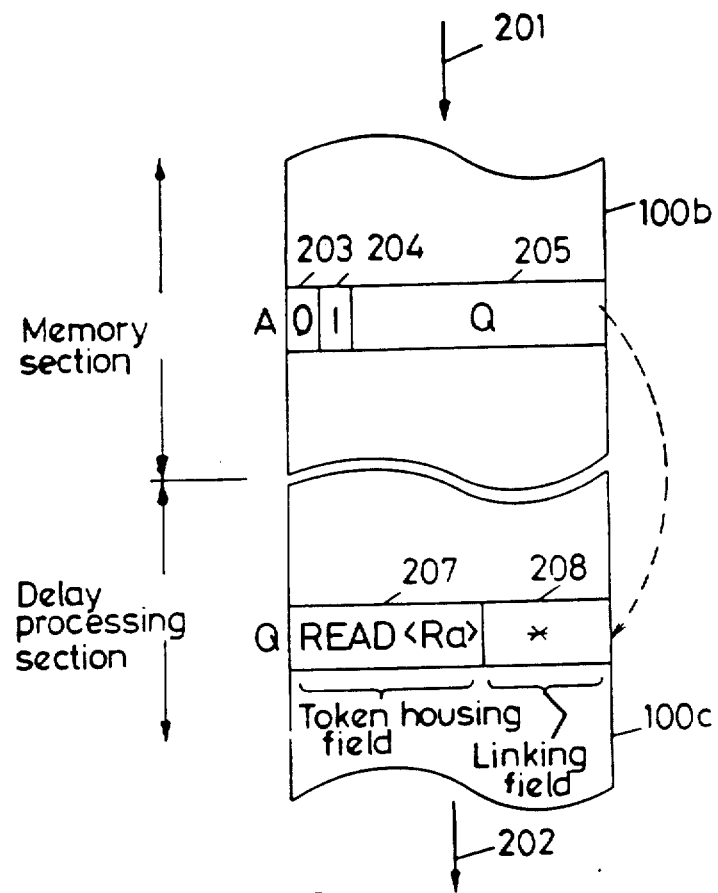
Figure 3A:
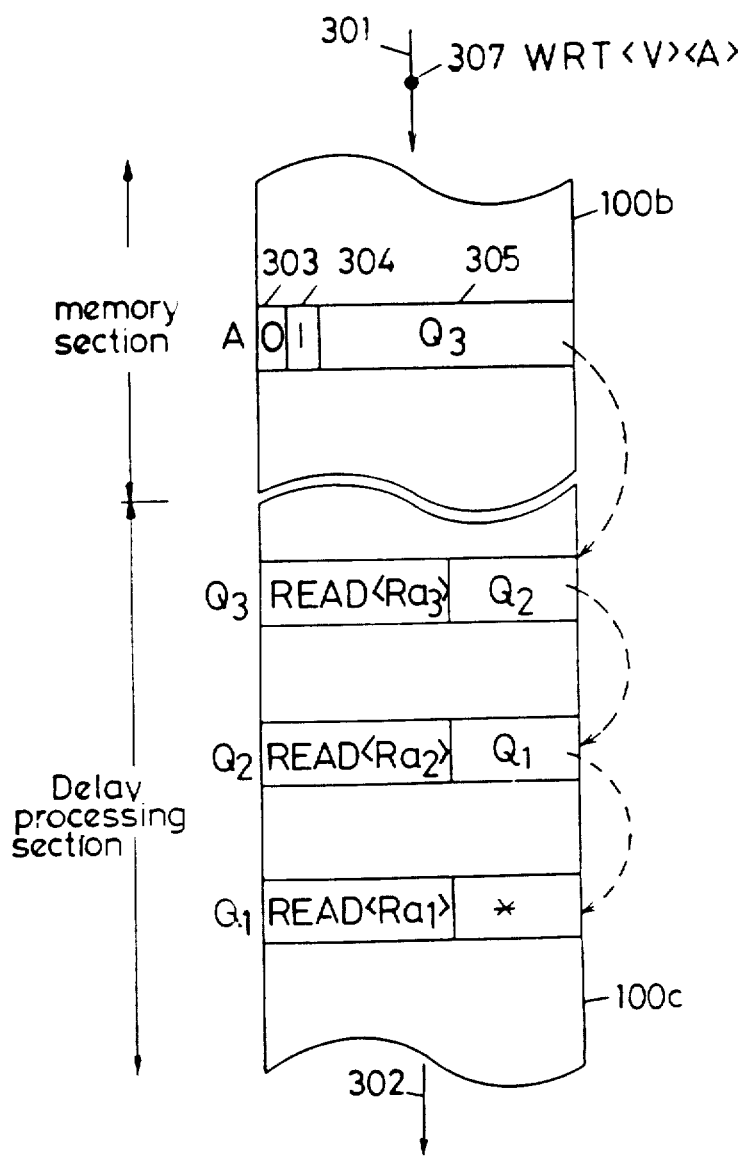
Figure 3B:
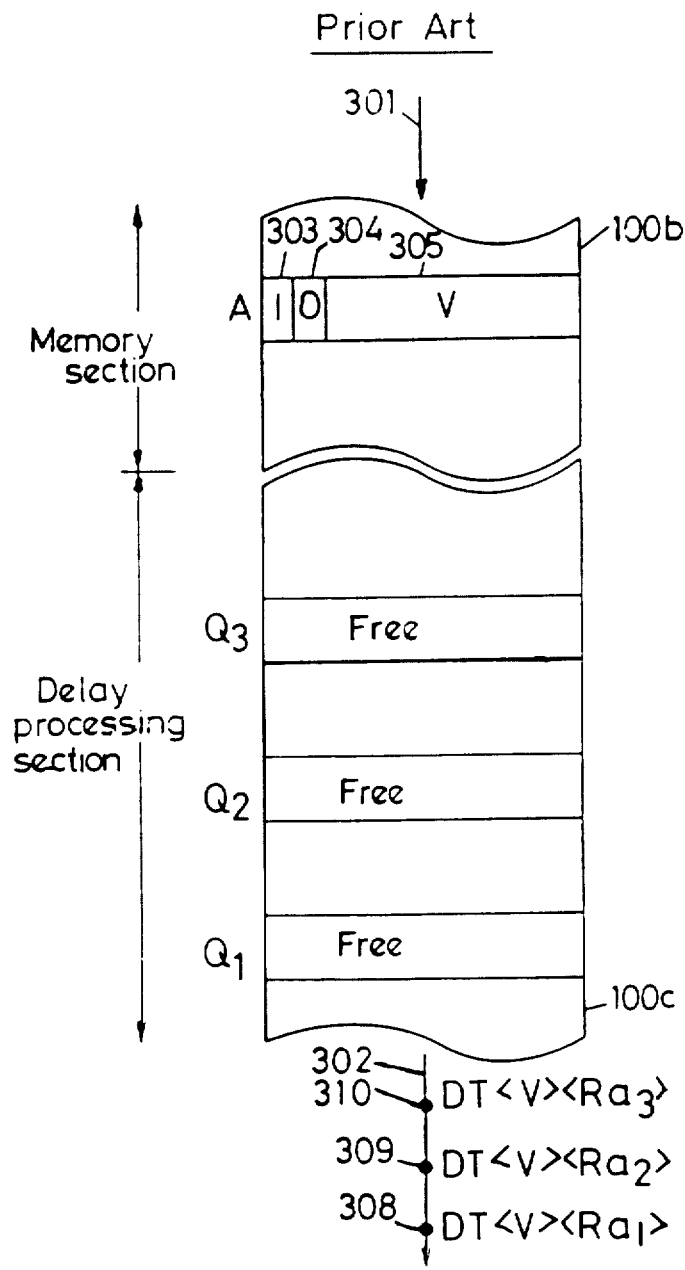
Figure 4A:
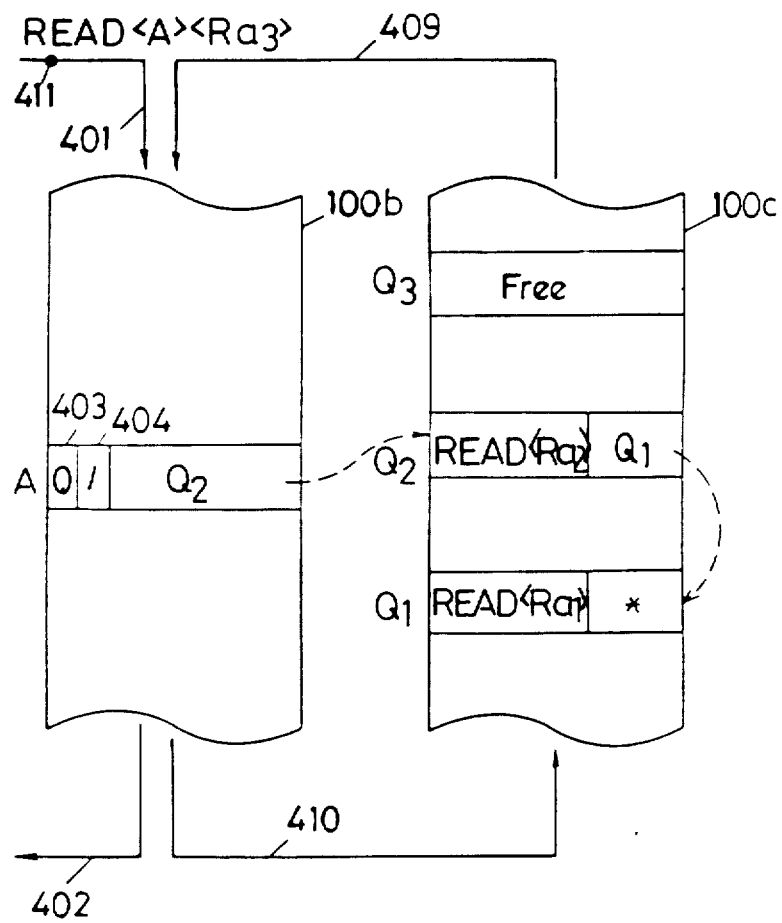
Figure 4B:
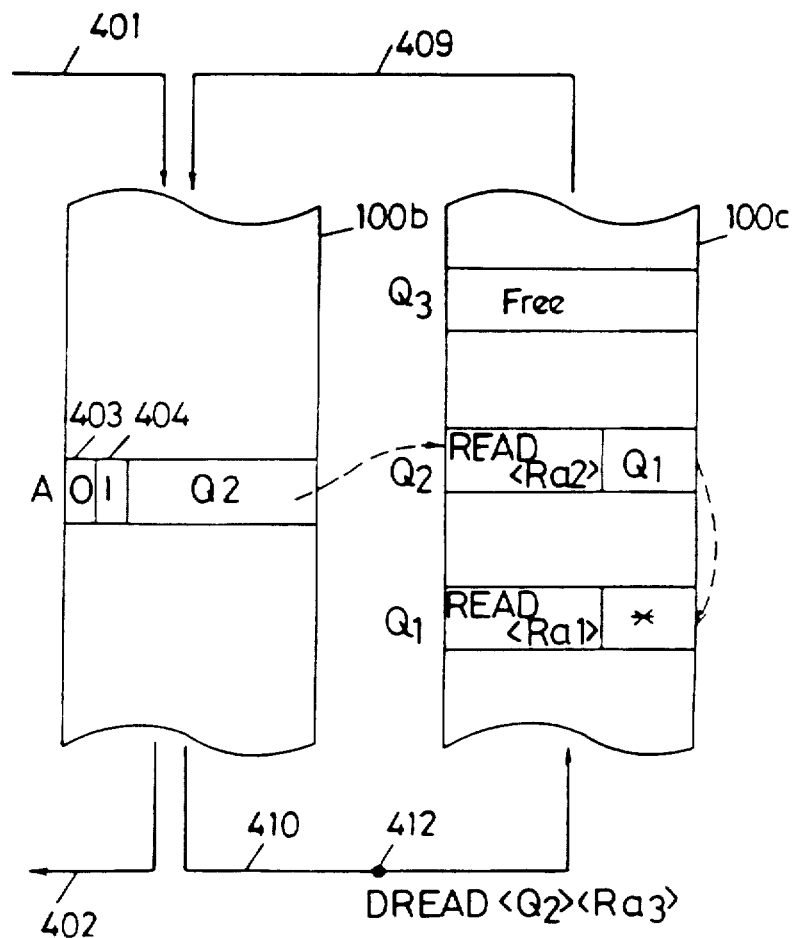
Figure 4C:
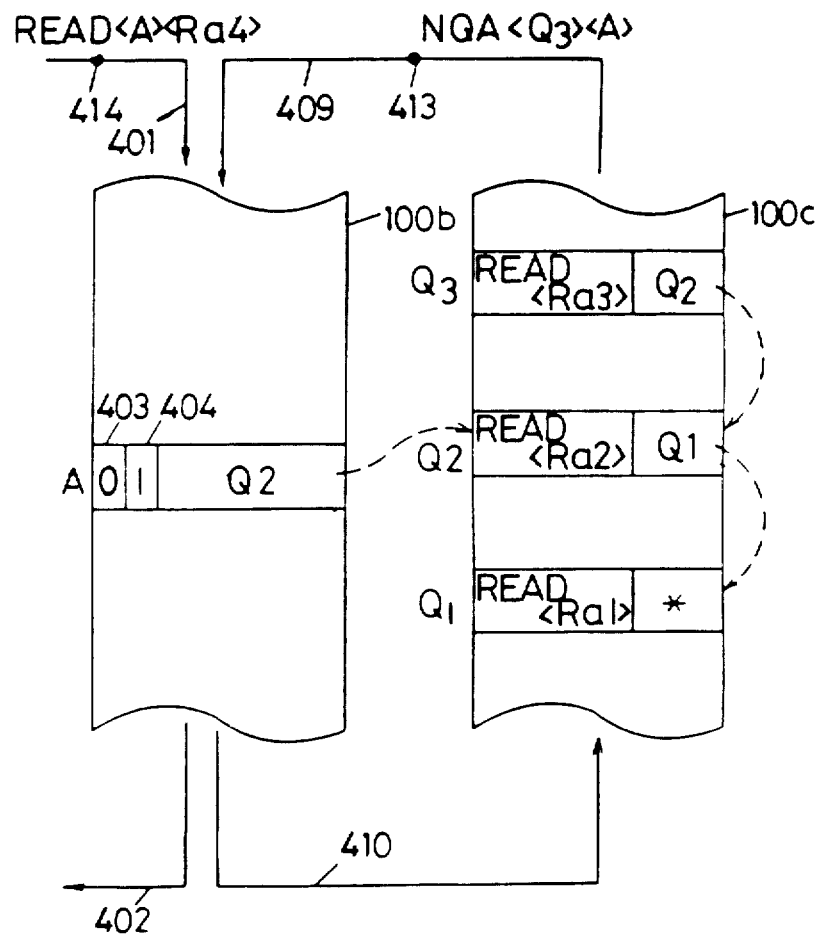
Figure 4D:
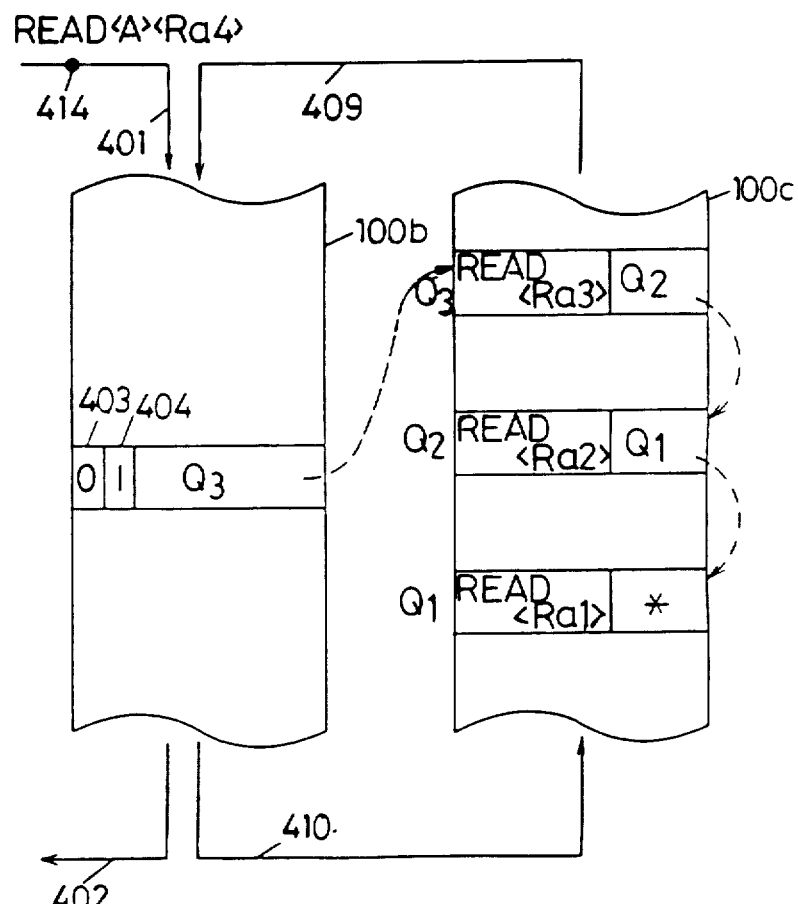
Figure 4E:
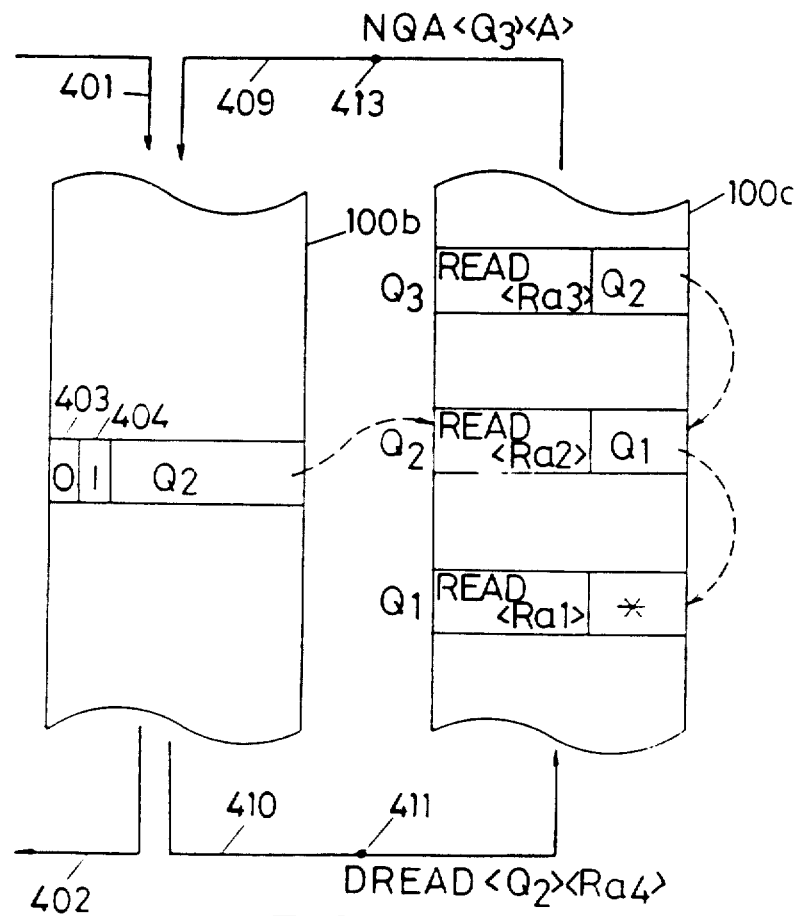
Figure 4F:
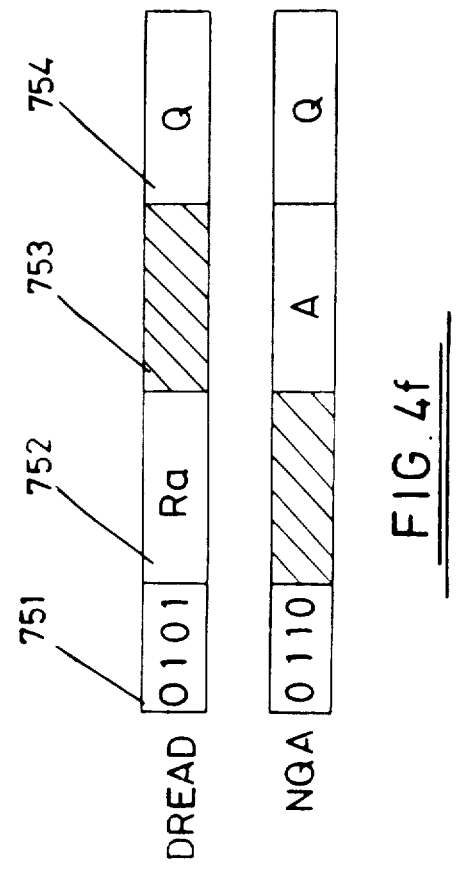
Figure 5:
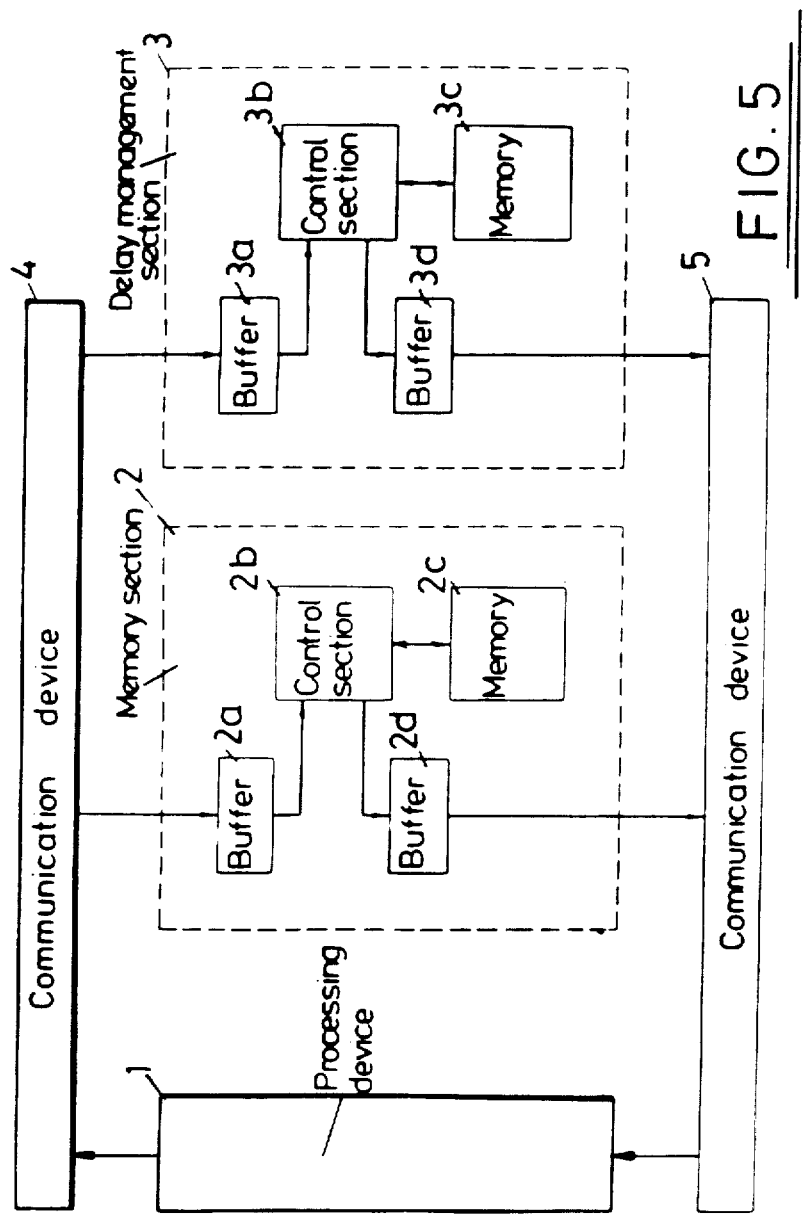
FIG. 5 is a block line diagram of a delay processing device of the prior art.
Figure 6:
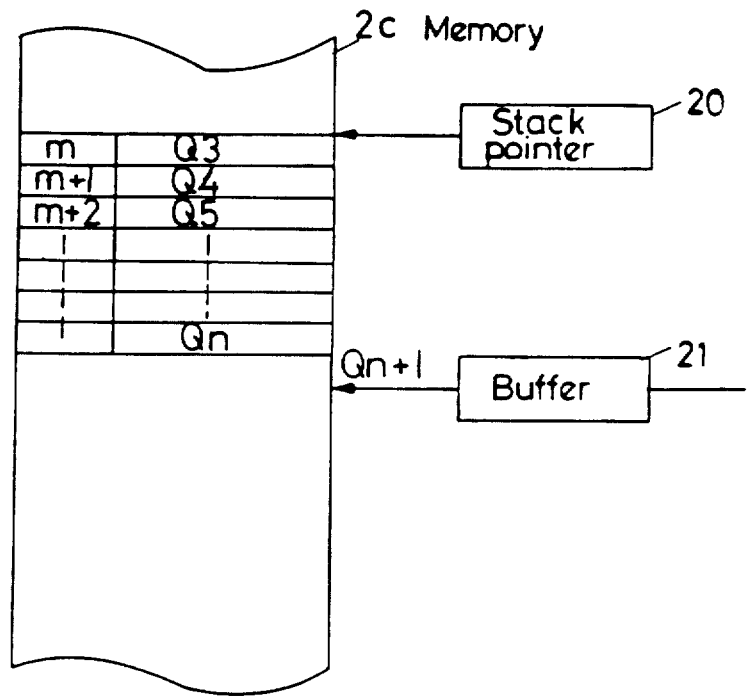
FIG. 6 is a block line diagram of the main parts of the device of FIG. 5.
Figure 7A:
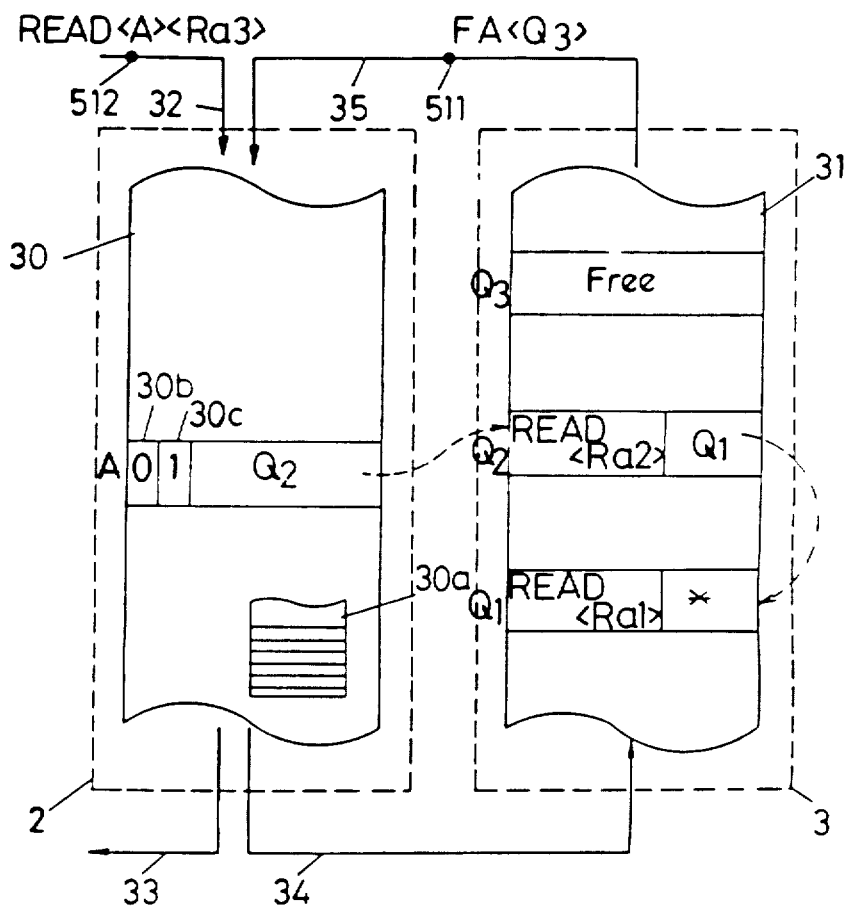
FIGS. 7a to 7g are schematic diagrams to show the delay processing method of the device of FIG. 1.
Figure 7B:
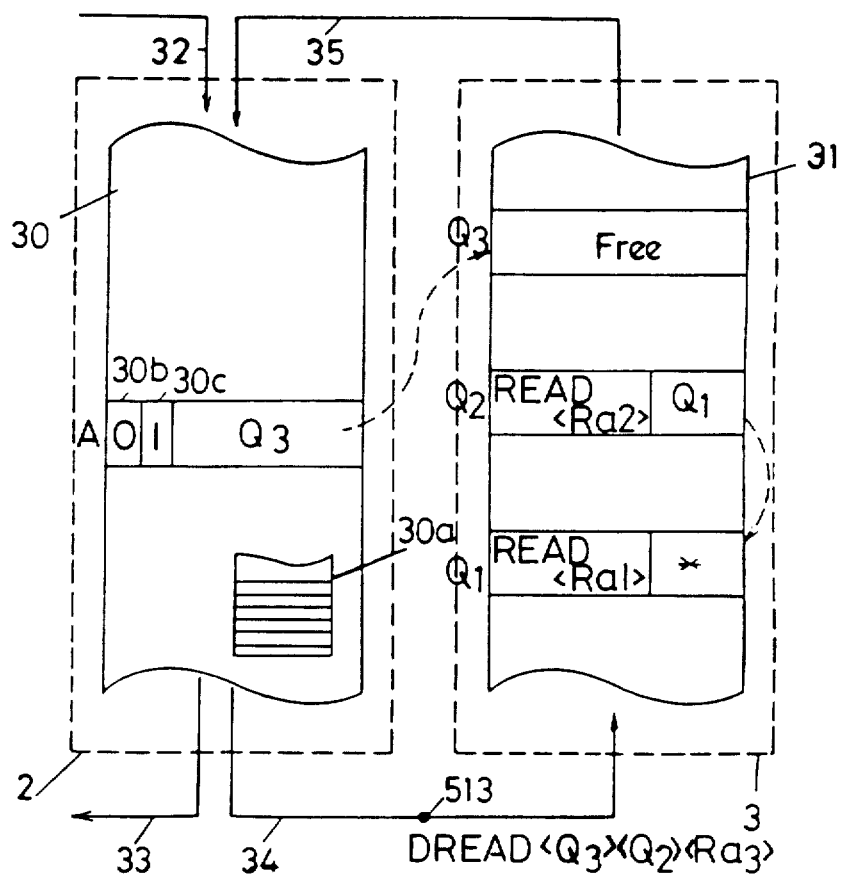
Figure 7C:
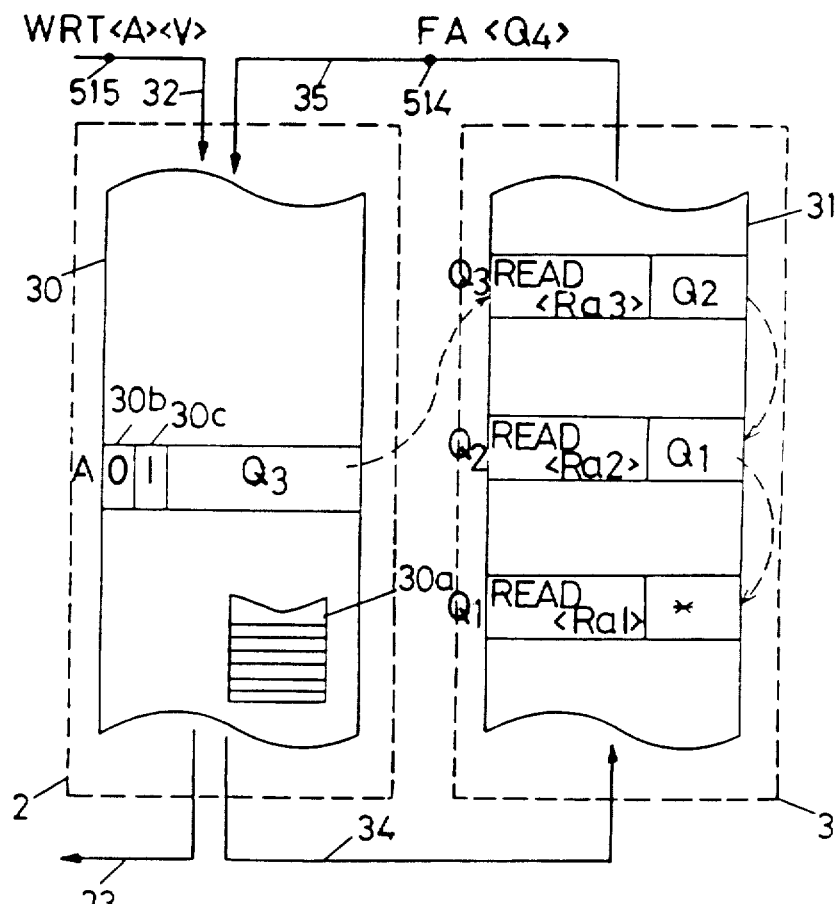
Figure 7D:
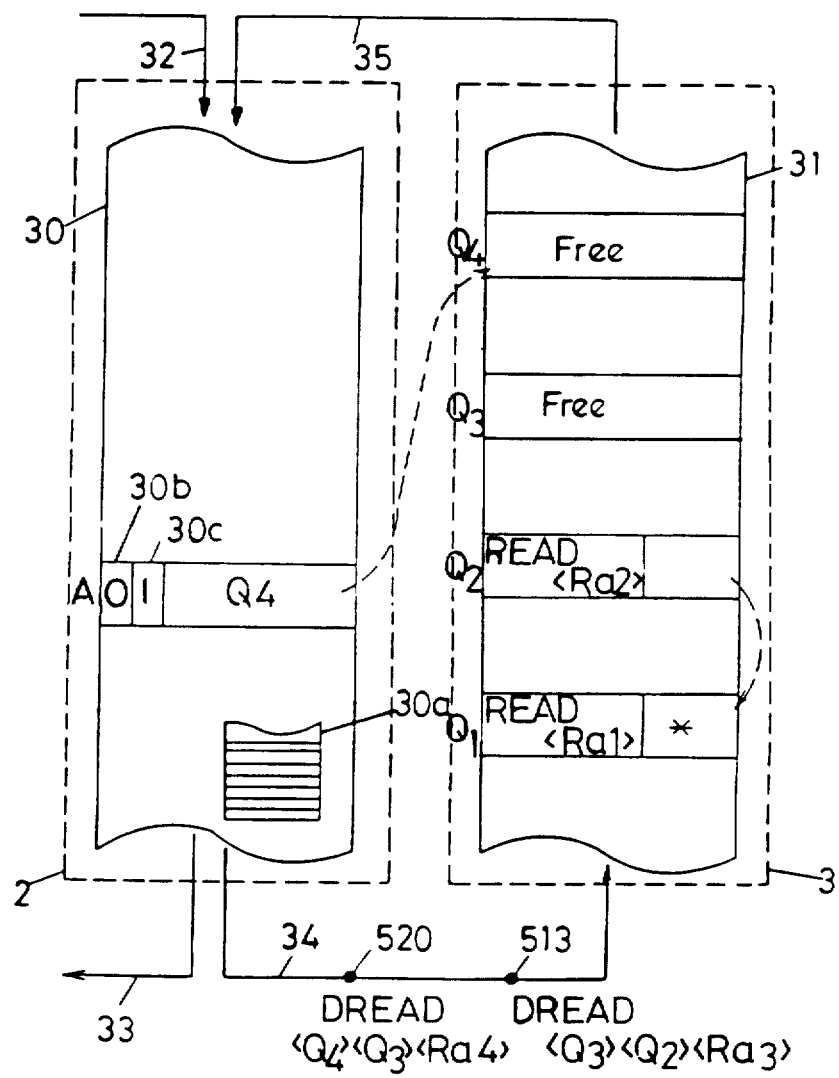
Figure 7E:
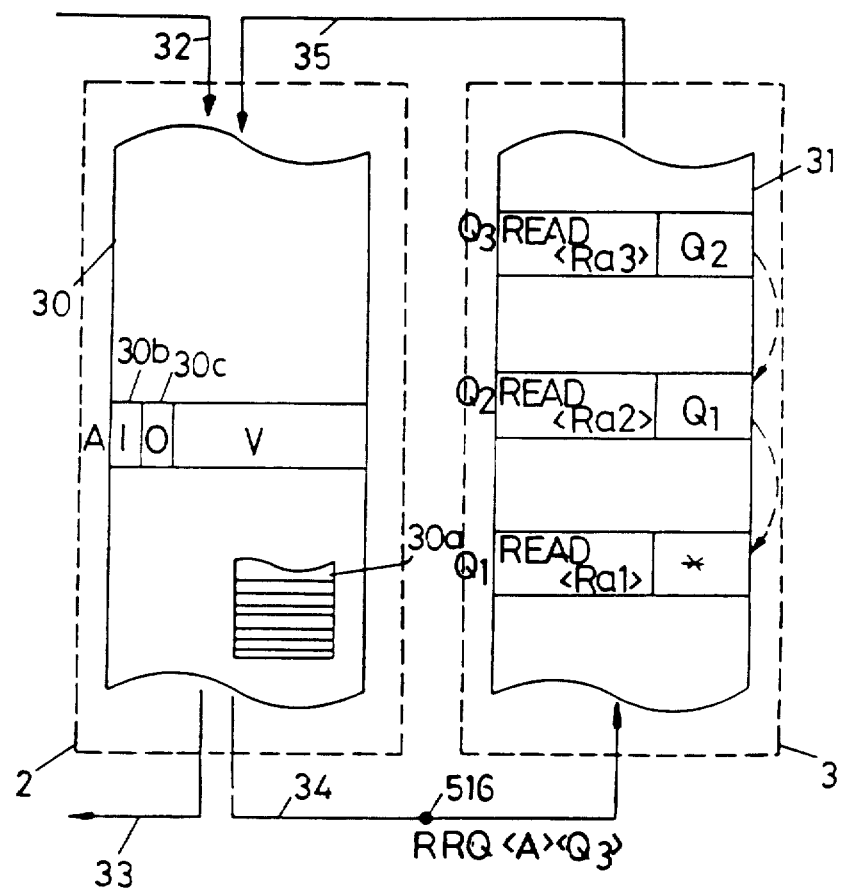
Figure 7F:
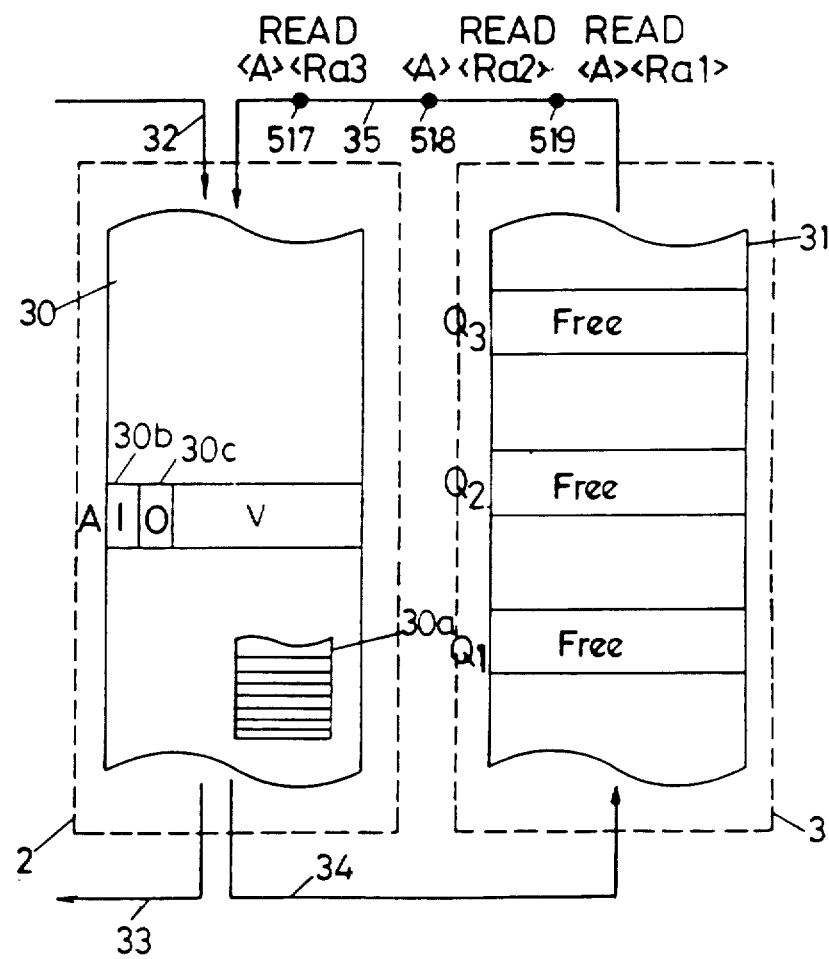
Figure 7G:
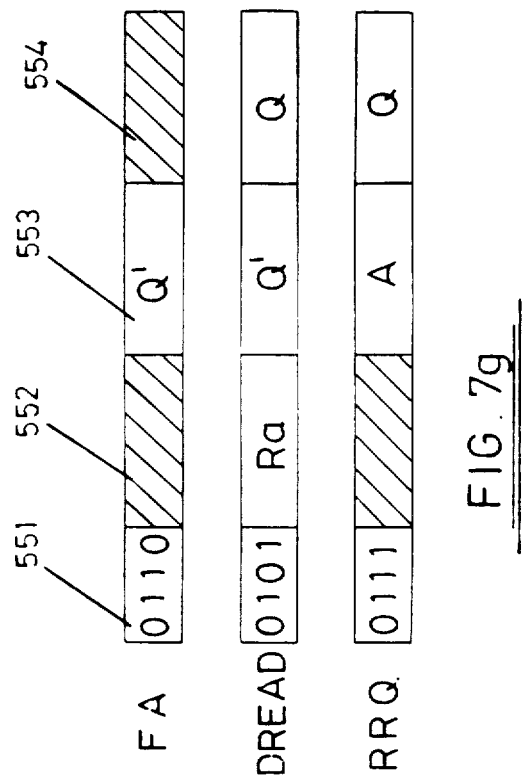
Figure 8A:
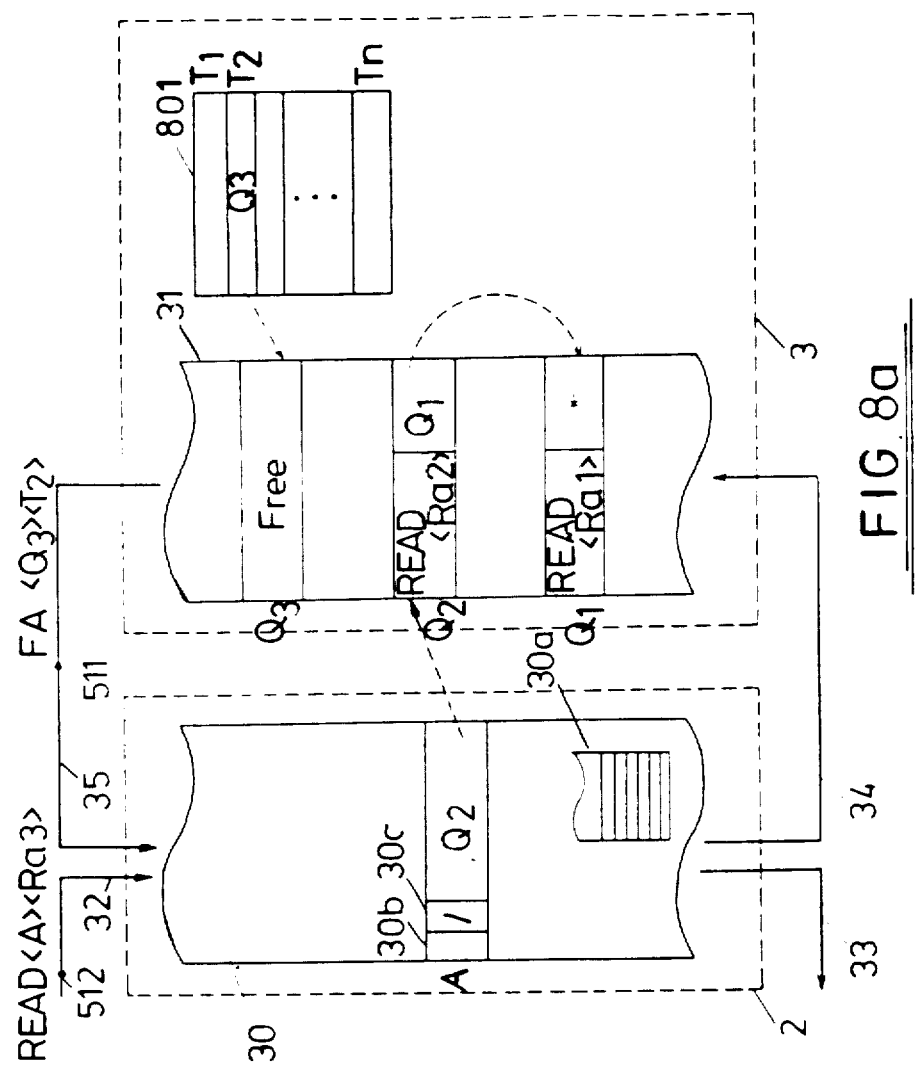
FIGS. 8a to 8c are block line diagrams of a device for data packet shortening in accordance with one example of the present invention.
Figure 8B:
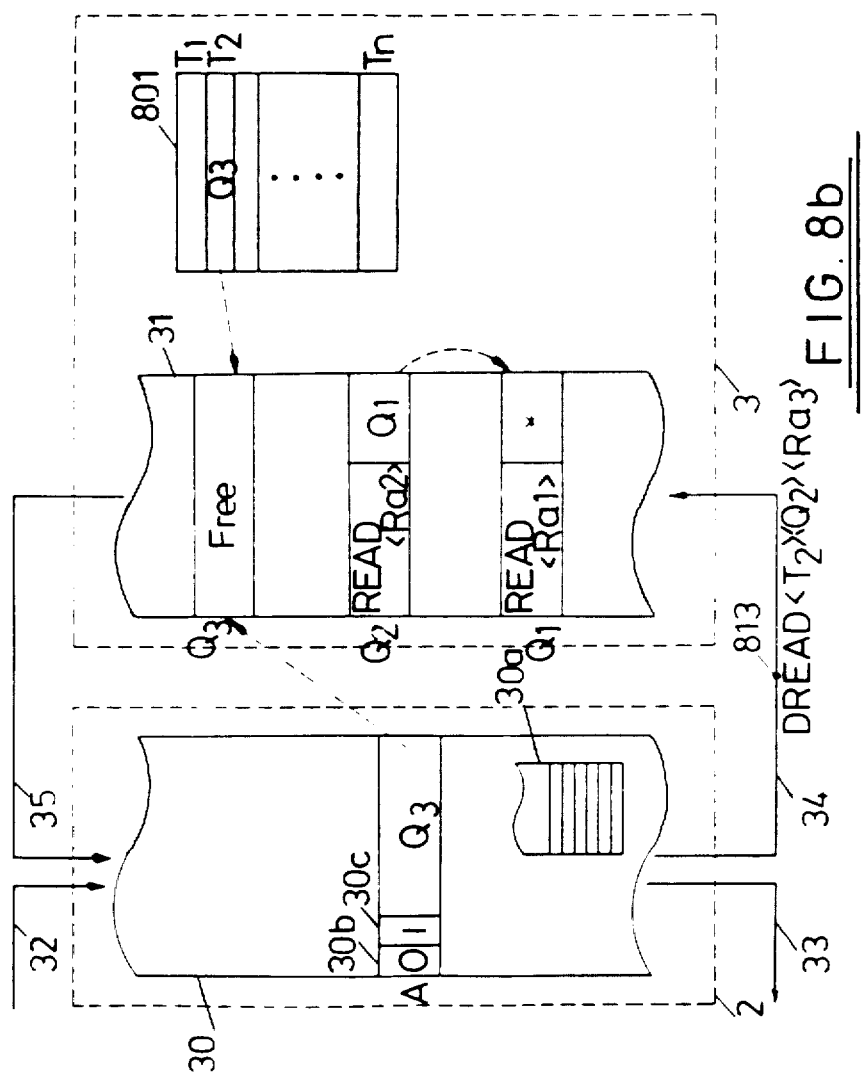
Figure 8C:
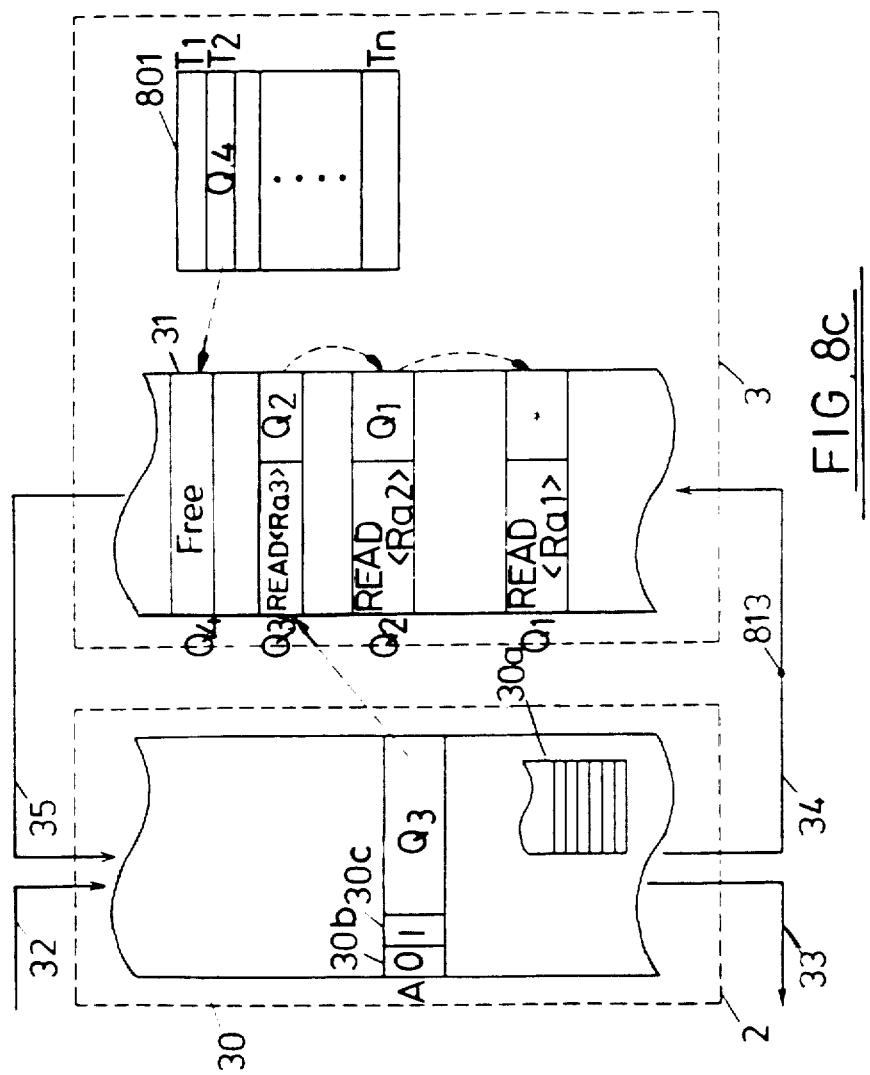

Referring to FIGS. 8a to 8c, corresponding elements to elements shown in FIGS. 7a to 7g carry the same reference numerals. The structure of FIGS. 8a to 8c differs from that of FIGS. 7a to 7g in that it provides a memory means 801 (hereinafter referred to as the "free address table") in which free addresses are temporarily housed.

FIG. 8a illustrates the same conditions as FIG. 7a. A free address token 801 has an extra parameter T2 as compared to the token 511 in FIG. 7a. The parameter T2 is the address in the free address table 801 at which the address Q3 is stored. In other words, T2 identifies the free address Q3 indirectly via the free address table 801.

The response to receipt of a read request which must be changed into a delay token will now be described.

1. When the memory section 2 receives the free address token 511 and the read request token 512, since the valid flag 30b is "0" it changes the read request token 512 to a delay token 513 and, as shown in FIG. 8b, sends this to the delay processing section 3. It deletes the parameters from the read request token 512 and joins the address Q2 held in the address A and the free address table parameter held in the free address token 811 to generate a delay token. The free address Q3 is stored in the address A. This is different from the response as described with reference to FIGS. 7a and 7b in that in the creation of the delay token 813 the free address table address T2 has been added instead of the address Q3 (Tn in free address stack 30a).

2. When the delay token 813 arrives at the delay processing section 3, the delay processing section 3 refers to the free address table 801 and from the free address table address T2 it derives the address Q3. As shown in FIG. 8c, data Ra3, Q2 taken from the delay token 813 is stored in the address Q2 which has been derived from the free address parameter T2 of the delay token 813. Since the address Q3 has already been entered in address A as described in paragraph 1 above, a delay series has thus been completed.

3. Since the free address table T2 is no longer in use, it can be used again. The delay processing section 3 enters a new free address Q4 into T2, and from the parameters T2 and Q4 provides a new free address token which it sends to the memory section 2.

The response to receipt of a write token is the same as that described with reference to FIG. 7e.

In the above, the present invention has been explained by taking as examples free address tokens and delay tokens, but this is not the only application for the present invention.

Figure 9A:
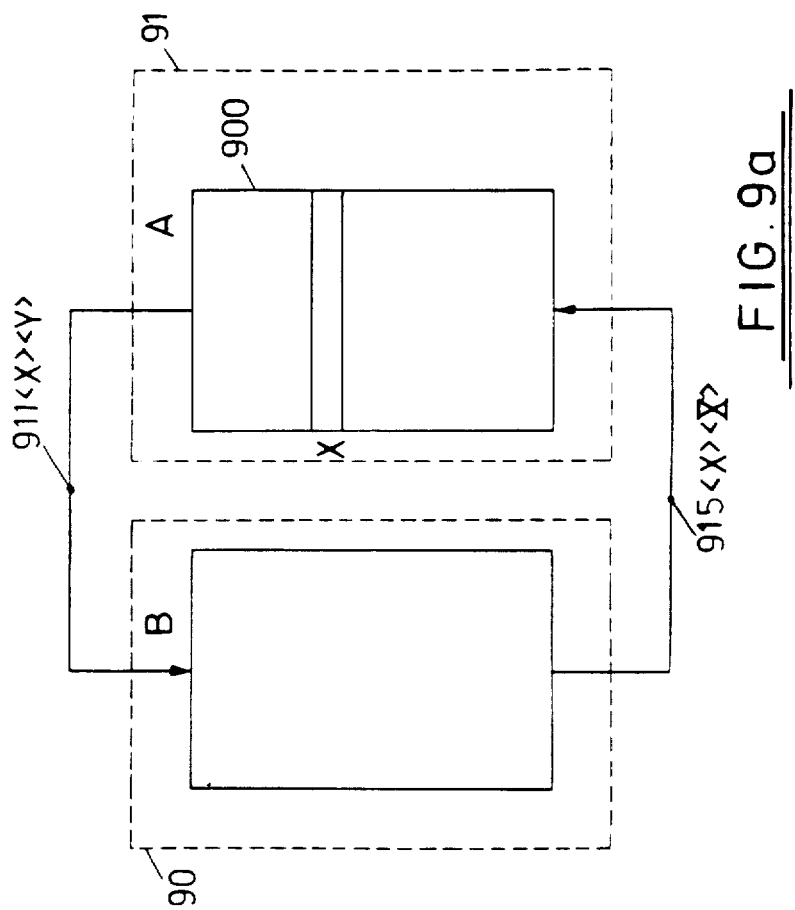
FIGS. 9a and 9b are block line diagrams of data packet shortening devices generally considered in connection with the present invention.

Referring to FIG. 9a, in a system in which data packets are exchanged between two devices, that is device A and device B, a part (x) of the information being sent from device A to device B is used by device B and sent as part of a data packet from device B to device A. The present invention can be used in any situation such as this in which the value of x is not changed.

In FIG. 9a, the token 911 has parameters x and y. The device B receives the token 911 and joins to it a parameter z to make a token 915 which it sends to device A. x is the address of device A.

Figure 9B:
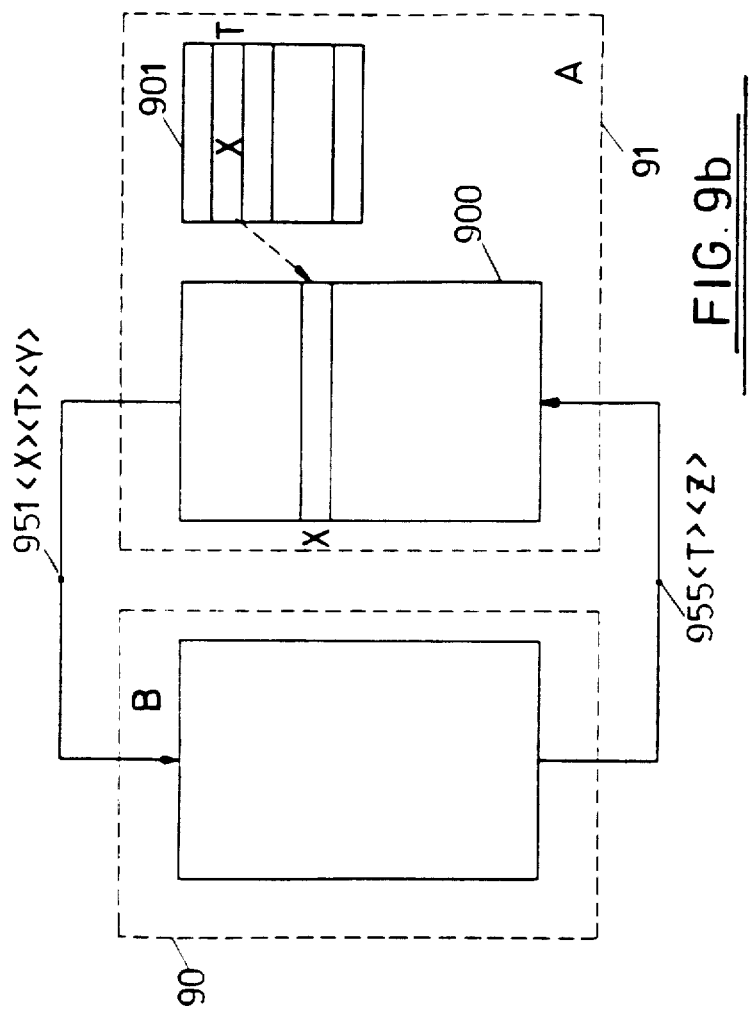

In such systems improvements can be made by applying the present invention as shown in FIG. 9b. A table 901 is provided which retains the parameter x temporarily in the device A. In the token 951 the parameter T is added to those held by 911, and in the token 955 x is replaced by T and returned. By doing this it is possible to reduce the data width of the tokens.

In the above example of the present invention, as in FIG. 9a, tokens are being exchanged between a device A and a device B, and in any system in which the same parameters are circulated, it is possible to reduce the data width of the tokens. This is because the parameter T of the token 955 in FIG. 9b has a smaller bit width than the parameter x of the token 915 in FIG. 9a. The bit width of T depends on the size of the table 901, and the bit width of x depends on the size of the available memory space 900 in the device A.

The size of the available memory space in the device A is determined by the possibilities required by the system, and the size of the table 901 should be larger than the sum total of the tokens which are being sent around the system and the tokens which are temporarily being accumulated in the device B. Accordingly the size of the table 901 is much smaller than the size of the memory space of the device A 900, and as a result of this, the bit width of the parameter T can be much smaller than the bit width of the parameter x. When the bit width of the data in token 955 is reduced, the token channel hardware can be much cheaper.

We claim:

1. A method of operating a data packet communication system, the system comprising a first device, a second device, means for transmitting first data packets from the first device to the second device, and means for transmitting second data packets from the second device to the first device, the first device comprising an available memory space having a plurality of addresses and a memory table which is smaller than the available memory space and having a plurality of addresses, the bit length of the addressees of the memory table being less than the bit length of the addresses of the available memory space, the method comprising the steps of:

storing addresses of the available memory space at respective addresses of the memory table, forming the first data packets such that each first data packet comprises at least an address of the available memory space and an address in which the address of the available memory space is stored, storing in the second device the addresses transmitted to the second device in the first data packet, forming the second data packets such that each second data packet comprises data and the address of the memory table in which is stored the address of the available memory space at which the data is to be stored, and storing the data in the address of the available memory space which is stored in the address of the memory table included in the transmitted second data packet.

2. A data packet communication system comprising:
a first device,
a second device,
first data packet transmitting means for transmitting first data packets from the first device to the second device, and
second data packet transmitting means for transmitting second data packets from the second device to the first device,
the first device further comprising an available memory space having a plurality of addresses, a memory table which is smaller than the available memory space and has a plurality of addresses, and means for storing addresses of the available memory space at respective addresses of the memory table, the bit length of the addresses of the memory table being less than the bit length of the addresses of the available memory space,
the first data packet transmitting means further comprising means for transmitting data packets each comprising at least an address of the available memory space and the address in which said address of the available memory space is stored,
the second device further comprising means for storing the addresses transmitted to it in the first data packet,
the second data packet transmitting means further comprising means for transmitting data packets each comprising data and the address of the memory table in which is stored the address of the available memory space at which the data is to be stored, and the first device further comprising means for storing the data in the address of the available memory space which is stored in the address of the memory table included in the transmitted second data packet.

3. A data packet communication system according to claim 2, wherein the first device further comprises means for storing at each address of the memory table the address of a respective free address of the available memory space, and the storing means of the second device further comprises means for storing the free address and the address of the memory table at which that free address is stored.

4. A data packet communication system according to claim 3, wherein the second device comprises
means for receiving read request inputs and write request inputs,
means for identifying an address to which the requests relate,
first means for indicating in respect of each address whether or not data has been written to that address,
means for producing a second data packet in the form of a delayed read request if a read request is received relating to an address to which data has not yet been written and for storing in the address a free address,
second means for indicating in respect of each address whether or not a read request has been received relating to that address before data was written thereto to result in the generation of the delayed read request, and
means for producing a further second data packet if a write request is received relating to an address the respective second indicating means of which indicates that a delayed read request has been produced, the further second data packet being in the form of a read request which identifies the free address previously stored in the address.

* * * * *

UNITED STATES PATENT AND TRADEMARK OFFICE
CERTIFICATE OF CORRECTION

PATENT NO. : 4,860,250

DATED : August 22, 1989

INVENTOR(S) : John R. Gurd, et al.

It is certified that error appears in the above-identified patent and that said Letters Patent is hereby corrected as shown below:

On the title page, please insert --[73] Assignee: The Victoria University of Manchester, Manchester, United Kingdom and Matsushita Electric Industrial Co., Ltd., Ohsaka, Japan--

Signed and Sealed this

Fourteenth Day of January, 1992

Attest:

HARRY F. MANBECK, JR.

*Attesting Officer*     *Commissioner of Patents and Trademarks*